United States Patent Office 3,257,412
Patented June 21, 1966

3,257,412
D-RING LACTAMS OF 3-OXYGENATED ESTRA-1,3,5(10)-TRIENES AND DERIVATIVES THEREOF
John S. Baran, Morton Grove, Ill., assignor to G. D. Searle & Co., Chicago, Ill., a corporation of Delaware
No Drawing. Filed Apr. 27, 1964, Ser. No. 362,973
11 Claims. (Cl. 260—326.1)

The present invention is concerned with novel steroidal D-ring lactams and related compounds and, more particularly, with 3-oxygenated 16-aza-17-oxoestra-1,3,5(10)-trienes and derivatives thereof, which can be represented by the following structural formulas

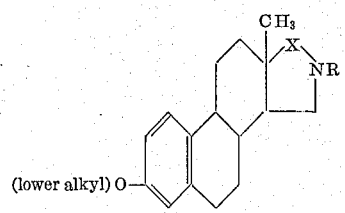

and

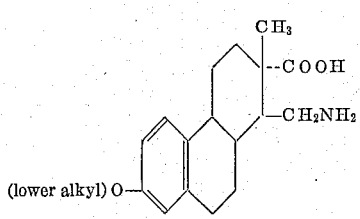

wherein X can be a carbonyl, hydroxymethylene, or methylene radical, and R is either hydrogen or a lower alkyl radical.

The lower alkyl radicals encompassed in the foregoing structural representations are typified by methyl, ethyl, propyl, butyl, pentyl, hexyl, and the branched-chain groups isomeric therewith.

The compounds of this invention are conveniently produced by utilizing as starting materials the trans-2-carboxy-1-formyl-2-methyl - 1,2,3,4,4a,9,10,10a - octahydrophenanthren-7-ol 7-(lower alkyl) ethers represented by the structural formula

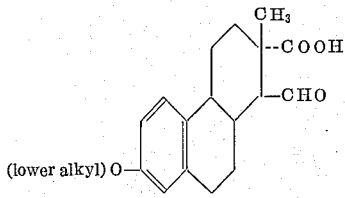

The latter substance, as is described in my copending application Serial No. 302,011, filed August 14, 1963, are obtained by a process utilizing as starting materials 3-(lower alkoxy)estra-1,3,5(10)-trien-17-one 17-enol esters. As a specific example, 17-acetoxyestra-1,3,5(10),16-tetraen-3-ol 3-methyl ether in methylene chloride is contacted with a stream of oxygen containing ozone to yield trans-2-carboxy-1 - formylmethyl-2 - methyl - 1,2,3,4,4a,9,10,10a-octahydrophenanthren-7-ol 7-methyl ether. Dehydration of that aldehydo acid, typically with p-toluenesulfonic acid in benzene, results in 3-methoxy-17-oxaestra-1,3,5-(10),15-tetraen-17a-one, which is submitted to an ozonolysis process analogous to that described above to produce trans-2-carboxy-1-formyl-2-methyl-1,2,3,4,4a,9,10,-10a-octahydrophenanthren-7-ol 7-methyl ether. Reductive amination of those aldehydo acids affords the corresponding amino acids, which are cyclized by heating, preferably in a relatively high boiling solvent mixture, to yield the instant D-ring lactams. Those processes are exemplified by the reaction of the aforementioned trans-2-carboxy-1-formyl-2-methyl - 1,2,3,4,4a,9,10,10a-octahydrophenanthren-7-ol 7-methyl ether with ammonia in a hydrogen atmosphere at about 58 atmospheres pressure and at a temperature of about 80° in the presence of Raney nickel catalyst to yield trans-1-aminomethyl-2-carboxy-2-methyl - 1,2,3,4,4a,9,10,10a - octahydrophenanthren-7-ol 7-methyl ether. Cyclization of that substance to produce 16-aza-3-methoxyestra-1,3,5(10)-trien-17-one is effected by heating in xylene-methylene chloride solution while the water formed is removed azeotropically. Reaction of these lactams with a suitable alkylating agent results in the corresponding N-alkyl derivatives. Such a process is typified by the alkylation of 16-aza-3-methoxyestra-1,3,5(10)-trien-17-one with methyl iodide in the presence of sodium hydride, resulting in 3-methoxy-N-methyl-16-azaestra-1,3,5(10)-trien-17-one.

Reduction of the oxo group of the instant lactams affords the corresponding 17-hydroxy and 17-unsubstituted 16-aza compouds. The course of the reaction is determined by the choice of reagents. Lithium aluminum hydride, for example, affords the 17-unsubstituted compounds exclusively, while a reagent such as disobutyl aluminum hydride produces also the 17-hydroxy derivatives. Those processes are specifically illustrated by the reaction of 16-aza-3-methoxyestra-1,3,5(10)-trien-17-one with lithium aluminum hydride in tetrahydrofuran to yield 16-azaestra-1,3,5(10)-trien-3-ol 3-methyl ether and the reaction of N-methyl-16-aza - 3 - methoxyestra-1,3,5(10)-trien-17-one in toluene with diisobutyl aluminum hydride to afford N-methyl-16-azaestra-1,3,5(10)-trien-3-ol 3-methyl ether and N-methyl-16-aza-3-methoxyestra-1,3,5-(10)-trien-17-ol. The latter substance is obtained as a mixture of the 17α- and 17β-epimers.

The compounds of the present invention display valuable pharmacological properties. They are anti-inflammatory agents, as is evidenced by their ability to inhibit the local edema formation typical of inflammatory states, and are also hypocholesterolemic agents. In addition, they exhibit antibacterial, antiprotozoal, and antifungal activity as is demonstrated by their growth-inhibiting action toward such organisms as *Diplococcus pneumoniae, Tricophyton mentagrophytes, Candida albicans, Tetrahymena gellei,* and *Chlorella vulgaris.* Similarly, they inhibit dicotyledonous seed germination.

The invention will appear more fully from the examples which follow. These examples are set forth by way of illustration only, and it will be understood that the invention is not to be construed as limited in spirit or in scope by the details contained therein as many modifications in materials and methods will be apparent from this disclosure to those skilled in the art. In these examples temperature are given in degrees centigrade (° C.) and quantities of materials in parts by weight unless otherwise noted.

Example 1

Into a solution of 9.3 parts of 17-acetoxyestra-1,3,5-(10),16,-tetraen-3-ol 3-methyl ether in 147 parts of methylene chloride, at about −70°, is passed a stream of oxygen containing 6% of ozone until one molecular equivalent of ozone is absorbed. To that reaction mixture is then added successively 2 parts of zinc and 42 parts of acetic acid, and the resulting mixture is stirred after the cooling bath is removed. An exothermic reaction ensues, causing the temperature to rise to the reflux point, at which time heating is continued on the steam bath for about 15 minutes while the methylene chloride is removed by distillation. The residual mixture is diluted with about 300 parts of chloroform, then is filtered, and the filtrate is washed successively with water, dilute hydrochloric acid and water. Distillation of the solvent at reduced pressure affords a residue which is dissolved in 30 parts of pyridine. To that pyridine solution is added a solution of 4 parts of potassium carbonate in 50 parts of water, and the resulting mixture is heated at about 90° for about 45 minutes, then is cooled to room temperature and poured carefully into a mixture of ice and excess dilute hydrochloric acid. The precipitate which forms is collected by filtration, washed on the filter with water, and dried in vacuo to afford trans - 2 - carboxy - 1 - formylmethyl-2-methyl-1,2,3,4,4a,9,10,10a-octahydrophenanthren-7-ol 7-methyl ether, melting at about 146–150°. Recrystallization of this crude product from a mixture of ether and hexane affords the pure material, characterized by a melting point of 155° and an optical rotation of +79° in chloroform. Infrared absorption maxima are observed at about 3.41, 3.67, 5.79, 5.88, 6.21, 7.79, and 9.62 microns.

A mixture of 1.2 parts of trans-2-carboxy-1-formylmethyl - 2 - methyl-1,2,3,4,4a,9,10,10a-octahydrophenanthren-7-ol 7-methyl ether and 1.2 parts of p-toluenesulfonic acid monohydrate in 440 parts of benzene is distilled over a period of about 2 hours, during which time approximately 220 parts of benzene is collected. The reaction mixture is cooled to room temperature, then is washed with saturated aqueous sodium bicarbonate, dried over anhydrous magnesium sulfate, and concentrated to dryness at reduced pressure. The residue which remains is triturated with ether to afford 3-methoxy-17-oxa-D-homoestra-1,3,5(10),15-tetraen-17a-one, which melts at about 139–149°. Decolorization by means of activated carbon followed by recrystallization from acetone results in the pure material, characterized by a melting point of about 155–158° and an optical rotation of −109° in chloroform. This compound displays infrared absorption peaks at about 3.38, 5.63, 6.02, 6.18, 8.58, 9.20, and 9.76 microns.

Into a solution of 6 parts of 3-methoxy-17-oxa-D-homoestra-1,3,5,(10),15-tetraen-17a-one in 94 parts of methylene chloride, at −70°, is passed a stream of oxygen containing 6% of ozone. After approximately one molecular equivalent of ozone has been absorbed, the solution is flushed by means of a stream of nitrogen in order to remove excess oxidant, and 6 parts of zinc followed by 21 parts of acetic acid is added. This mixture is stirred at room temperature for about 45 minutes, then is concentrated to a small volume by distillation, and is diluted with about 600 parts of chloroform. The resulting mixture is filtered, and the filtrate is washed successively with water, dilute hydrochloric acid, and water. Distillation of this organic solution to dryness under reduced pressure affords a residue which is dissolved in 25 parts of pyridine. To that pyridine solution is added a solution of 6 parts of potassium carbonate in 100 parts of water, and that mixture is heated at about 90° for about 45 minutes, then is cooled to room temperature and is poured gradually with stirring into a mixture of ice and excess dilute hydrochloric acid. The resulting precipitated solid is collected by filtration, washed with water on the filter and dried, resulting in trans-2-carboxy-1-formyl-2-methyl-1,2,3,4,4a,-9,10,10a-octahydrophenanthren-7-ol 7-methyl ether, melting at about 174–176°. Two successive recrystallizations from ether-acetone produce a sample of the pure material, melting at about 191–193° and characterized further by infrared absorption peaks at about 3.39, 3.63, 5.79, 5.84, 6.21, 7.75, 8.89, and 9.62 microns.

*Example 2*

The submission of an equivalent quantity of 17-acetoxyestra-1,3,5(10),16-tetraen-3-ol 3-ethyl ether to the successive processes of Example 1 results in trans-2-carboxy-1-formylmethyl - 2 - methyl - 1,2,3,4,4a,9,10,10a-octahydrophenanthren-7-ol 7-ethyl ether, 3-ethoxy-17-oxa-D-homoestra-1,3,5(10),15-tetraen-17a-one, and trans-2-carboxy-1 - formyl-2-methyl-1,2,3,4,4a,9,10,10a-octahydrophenanthren-7-ol 7-ethyl ether.

*Example 3*

A mixture of 9.75 parts of trans-2-carboxy-1-formyl-2-methyl-1,2,3,4,4a,9,10,10a-octahydrophenanthren-7-ol 7-methyl ether, 25 parts of Raney nickel catalyst, and 976 parts by volume of 2:1 methanol-concentrated ammonium hydroxide is shaken in an atmosphere of hydrogen at 80° and approximately 58 atmospheres pressure for about 7 hours. The catalyst is removed by filtration and is washed with 1:1 chloroform-methanol. The combined filtrates are evaporated to dryness under reduced pressure, and the resulting residue is triturated with methanol to afford trans-1-aminomethyl-2-carboxy-2-methyl-1,2,3,4,-4a,9,10,10a-octahydrophenanthren-7-ol 7-methyl ether, melting with decomposition at about 144°. It is represented by the following structural formula

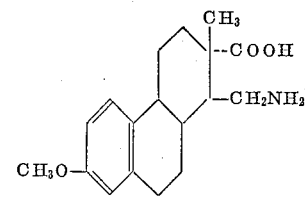

The latter product is dissolved in 500 parts by volume of 20:1 xylene-methylene chloride, and the resulting solution is slowly distilled over a period of about 1½ hours, during which time the volume is reduced to approximately one-half. The residual solution is chromatographed on a silica gel column, and the column is eluted with 90% chloroform in methanol to afford 16-aza-3-methoxyestra-1,3,5(10)-trien-17-one, which, after recrystallization from acetone, melts at about 202–205° and exhibits an optical rotation of +70.5° in chloroform. It is characterized further by infrared absorption peaks at about 2.91, 3.10, 5.88–5.92 and 6.22 microns and can be represented by the following structural formula

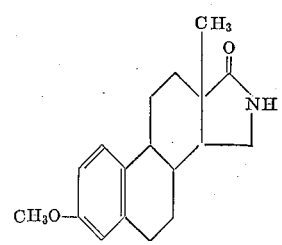

*Example 4*

To a solution of 3 parts of 16-aza-3-methoxyestra-1,3,5(10)-trien-17-one in 1350 parts of tetrahydrofuran is added, with stirring, 6.5 parts of lithium aluminum hydride, and the resulting reaction mixture is stirred at room temperature for about 20 hours. To that mixture is added successively 8 parts of water, 6 parts by volume of 20% aqueous sodium hydroxide, and 28 parts of water in order to destroy the excess reducing agent. That aqueous mixture is stirred at room temperature for about one hour, then is filtered, and the filter cake is washed with ether. The combined filtrates are evaporated to dryness to afford a residue containing 16-azaestra-1,3,5(10)-trien-3-ol 3-methyl ether. That residue is dissolved in excess aqueous hydrobromic acid, and the resulting solution is evaporated to dryness. Recrystallization of the crystalline residue from ethanol affords pure 16-azaestra-1,3,5,(10)-trien-3-ol 3-methyl ether hydrobromide, melting at about 275–277°. It is represented by the following structural formula

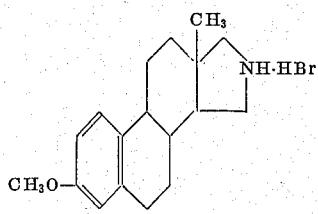

Example 5

A solution of 4 parts of 16-aza-3-methoxyestra-1,3,5-(10)-trien-17-one in 1740 parts of toluene is distilled until anhydrous. To that solution is then added one part of sodium hydride, and the resulting reaction mixture is heated at the reflux temperature for about 45 minutes, at which time 228 parts of methyl iodide is added. That reaction mixture is heated at the reflux temperature for about 30 minutes, then is cooled, washed with water, dried over anhydrous magnesium sulfate, and distilled to dryness under reduced pressure. Trituration of the residue with ether affords crystals of 3-methoxy-N-methyl-16-azaestra-1,3,5(10)-trien-17-one, melting at about 165–170°. A pure sample, melting at about 168–170°, is obtained by an additional recrystallization from acetone-hexane. This compound displays an optical rotation of +46.5° in chloroform and is represented by the following structural formula

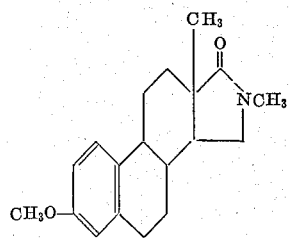

Example 6

The substitution of an equivalent quantity of 3-methoxy-N-methyl-16-azaestra-1,3,5(10)-trien-17-one in the procedure of Example 4 results in N-methyl-16-azaestra-1,3,5(10)-trien-3-ol 3-methyl ether. That amine is dissolved in ethanolic hydrogen chloride, and the resulting solution is evaporated to dryness to afford crystals of N-methyl-16-azaestra-1,3,5(10)-trien-3-ol 3-methyl ether hydrochloride, melting at about 220–225° with decomposition. It is further characterized by the following structural formula

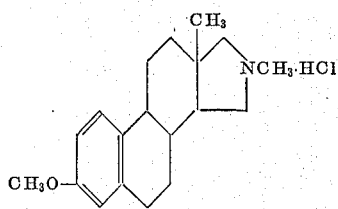

Example 7

A solution of 2.1 parts of 3-methoxy-N-methyl-16-azaestra-1,3,5(10)-trien-17-one in 1305 parts of toluene is distilled until anhydrous, then is cooled to about −70°. To the cooled solution, under nitrogen, is added 50 parts by volume of 1.4 N diisobutyl aluminum hydride in toluene, and the resulting reaction mixture is stirred for about 35 minutes. Approximately 40 parts of methanol is added, after which time the solution is allowed to warm to approximately 10°. Saturated aqueous sodium potassium tartrate followed by ether is added, and the resulting mixture is shaken in a nitrogen atmosphere. The organic layer is separated, dried over anhydrous sodium sulfate, then concentrated to dryness under reduced pressure.

The resulting residue contains N-methyl-16-azaestra-1,3,5(10)-trien-3-ol 3-methyl ether and N-methyl-16-aza-3-methoxyestra-1,3,5(10)-trien-17-ol. To that residue is added 1% aqueous perchloric acid and sufficient methanol to maintain solution. Concentration of that solution affords a residue which is triturated with methanol to afford crystals. Those crystals are collected by filtration and washed with water, then dried. Recrystallization of this crude product from methanol affords crystals of pure N-methyl-16-azaestra-1,3,5(10)-trien-3-ol 3-methyl ether perchlorate, melting at about 133–135° and represented by the structural formula

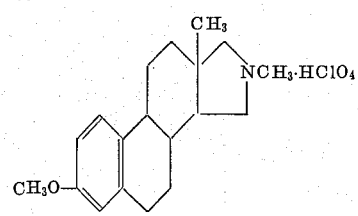

Concentration of the latter methanol mother liquor to dryness affords a residue which is fractionally crystallized from methanol to yield N-methyl-16-aza-3-methoxyestra-1,3,5(10)-trien-17-ol perchlorate. It exhibits a nuclear magnetic resonance peak at 287 cycles per second. This substance can be represented by the following structural formula

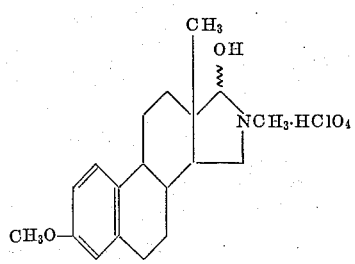

Example 8

The substitution of an equivalent quantity of trans-2-carboxy-1-formyl-2-methyl-1,2,3,4,4a,9,10,10a-octahydrophenanthren-7-ol 7-ethyl ether in the procedure of Example 3 results in trans-1-aminomethyl-2-carboxy-2-methyl-1,2,3,4,4a,9,10,10a-octahydrophenanthren-7-ol 7-ethyl ether and 16-aza-3-ethoxyestra-1,3,5(10)-trien-17-one.

Example 9

By substituting an equivalent quantity of 16-aza-3-ethoxyestra-1,3,5(10)-trien-17-one and otherwise proceeding according to the processes described in Example 4, 16-azaestra-1,3,5(10)-trien-3-ol 3-ethyl ether is obtained.

Example 10

When an equivalent quantity of 16-aza-3-ethoxyestra-1,3,5(10)-trien-17-one is methylated by the procedure described in Example 5, N-methyl-16-aza-3-ethoxyestra-1,3,5(10)-trien-17-one is obtained.

Example 11

The lithium aluminum hydride reduction of an equivalent quantity of N-methyl-16-aza-3-ethoxyestra-1,3,5(10)-trien-17-one by the procedure described in Example 6 results in N-methyl-16-azaestra-1,3,5(10)-trien-3-ol 3-ethyl ether.

Example 12

By substituting an equivalent quantity of ethyliodide and otherwise proceeding according to the processes described in Example 5, N-ethyl-16-aza-3-methoxyestra-1,3,5(10)-trien-17-one is obtained.

Example 13

The substitution of an equivalent quantity of N-ethyl-16-aza-3-methoxyestra-1,3,5(10)-trien-17-one in the procedure of Example 6 results in N-ethyl-16-azaestra-1,3,5-(10)-trien-3-ol 3-methyl ether.

What is claimed is:

1. A member selected from the group consisting of compounds of the formulas

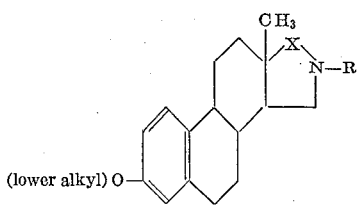

and

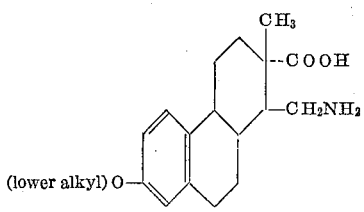

wherein X is a radical selected from the group consisting of carbonyl, hydroxymethylene, and methylene, and R is a member of the class consisting of hydrogen and lower alkyl radicals.

2. A compound of the formula

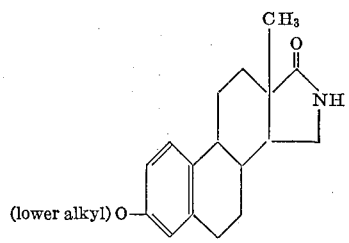

3. 16-aza-3-methoxyestra-1,3,5(10)-trien-17-one.
4. A compound of the formula

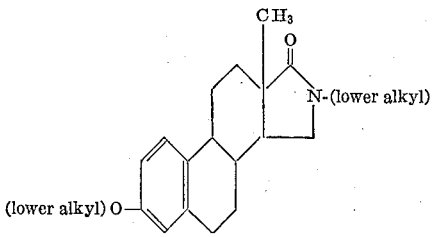

5. 3-methoxy-N-methyl-16-azaestra-1,3,5(10)-trien-17-one.
6. A compound of the formula

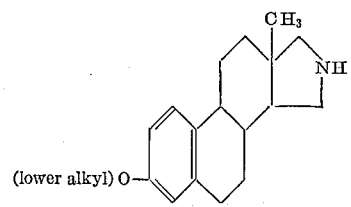

7. 16-azaestra-1,3,5(10)-trien-3-ol 3-methyl ether.
8. A compound of the formula

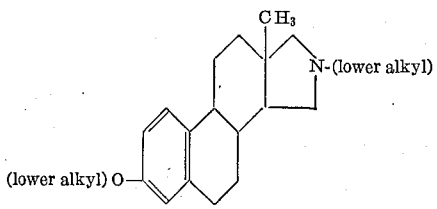

9. N-methyl-16-azaestra-1,3,5(10)-trien-3-ol 3-methyl ether.
10. A compound of the formula

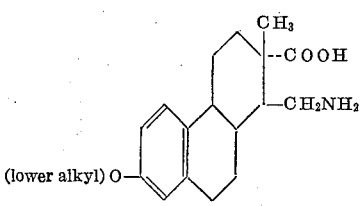

11. *Trans* - 1-aminomethyl-2-carboxy-2-methyl-1,2,3,4,-4a,9,10,10a-octahydrophenanthren-7-ol 7-methyl ether.

References Cited by the Examiner

Bachmann et al.: "Jour. Amer. Chem. Soc., vol. 72, June 1950, pp. 2527–2529.

NICHOLAS S. RIZZO, *Primary Examiner.*

MARY U. O'BRIEN, *Assistant Examiner.*